United States Patent
Tabet et al.

(10) Patent No.: US 9,549,080 B2
(45) Date of Patent: Jan. 17, 2017

(54) WI-FI SIGNALING BY CELLULAR DEVICES FOR COEXISTENCE IN UNLICENSED FREQUENCY BANDS

(71) Applicant: Apple Inc., Cupertino, CA (US)

(72) Inventors: Tarik Tabet, Los Gatos, CA (US); Farouk Belghoul, Campbell, CA (US); Dawei Zhang, Saratoga, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 14/610,426

(22) Filed: Jan. 30, 2015

(65) Prior Publication Data

US 2015/0223244 A1   Aug. 6, 2015

Related U.S. Application Data

(60) Provisional application No. 61/936,057, filed on Feb. 5, 2014.

(51) Int. Cl.
*H04M 11/06* (2006.01)
*H04L 5/00* (2006.01)
(Continued)

(52) U.S. Cl.
CPC .......... *H04M 11/062* (2013.01); *H04L 5/0098* (2013.01); *H04L 27/0006* (2013.01);
(Continued)

(58) Field of Classification Search
None
See application file for complete search history.

(56) References Cited

U.S. PATENT DOCUMENTS

2011/0205986 A1   8/2011   Medapalli
2012/0164948 A1*   6/2012   Narasimha ........ H04W 72/1215
                                                            455/63.1
(Continued)

FOREIGN PATENT DOCUMENTS

WO   2012158961 A1   11/2012
WO   2013179095       12/2013
WO   2014064322        5/2014

OTHER PUBLICATIONS

Cavalcante, Andre M. et al.; "Performance Evaluation of LTE and Wi-Fi Coexistence in Unlicensed Bands"; 77th Vehicular Technology Conference; Jun. 2-5, 2013; 6 pages; IEEE; United States.
(Continued)

*Primary Examiner* — Andrew Oh
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to Wi-Fi signaling in conjunction with cellular communication in unlicensed frequency bands for efficient co-existence. According to one embodiment, a cell may be established between a cellular base station and a wireless user equipment device on a frequency channel in an unlicensed frequency band. A cellular communication may be scheduled between the base station and the user equipment device. A Wi-Fi signal may be transmitted on the frequency channel in conjunction with the scheduled cellular communication. The Wi-Fi signal may indicate a length of the scheduled cellular communication using Wi-Fi signaling. The scheduled cellular communication may be performed via the cell.

20 Claims, 9 Drawing Sheets

(51) Int. Cl.
*H04W 72/12* (2009.01)
*H04L 27/00* (2006.01)
*H04W 84/12* (2009.01)
*H04W 88/10* (2009.01)

(52) U.S. Cl.
CPC ............ *H04W 72/12* (2013.01); *H04W 84/12* (2013.01); *H04W 88/10* (2013.01)

(56) References Cited

U.S. PATENT DOCUMENTS

| | | | |
|---|---|---|---|
| 2012/0170557 A1 | 7/2012 | Tsfati et al. | |
| 2013/0155884 A1* | 6/2013 | Wang | H04W 72/1215 370/252 |
| 2013/0155931 A1* | 6/2013 | Prajapati | H04W 72/044 370/311 |
| 2013/0196673 A1* | 8/2013 | Smadi | H04W 56/001 455/450 |
| 2013/0201884 A1* | 8/2013 | Freda | H04W 72/005 370/278 |
| 2013/0272260 A1* | 10/2013 | Bitran | H04W 16/14 370/329 |
| 2013/0322279 A1* | 12/2013 | Chincholi | H04W 36/0088 370/252 |
| 2014/0044105 A1 | 2/2014 | Bontu et al. | |
| 2014/0056277 A1 | 2/2014 | HomChaudhuri et al. | |
| 2014/0078906 A1* | 3/2014 | Chen | H04L 69/18 370/237 |
| 2014/0126504 A1* | 5/2014 | Jung | H04L 5/0037 370/329 |
| 2014/0177603 A1* | 6/2014 | Poojary | H04W 72/1215 370/336 |
| 2014/0269633 A1* | 9/2014 | Behnamfar | H04L 5/0073 370/336 |
| 2014/0335876 A1* | 11/2014 | Ratasuk | H04W 16/14 455/450 |
| 2014/0348094 A1* | 11/2014 | Charbit | H04W 56/00 370/329 |
| 2015/0043440 A1* | 2/2015 | Ko | H04W 74/04 370/329 |
| 2015/0043520 A1* | 2/2015 | Sun | H04L 5/001 370/330 |
| 2015/0065157 A1* | 3/2015 | Homchaudhuri | H04W 72/082 455/452.1 |
| 2015/0131511 A1* | 5/2015 | Ghosh | H04W 48/18 370/312 |
| 2015/0131536 A1 | 5/2015 | Kaur et al. | |
| 2015/0131541 A1* | 5/2015 | Prajapati | H04W 88/06 370/329 |
| 2015/0236829 A1* | 8/2015 | Ratasuk | H04L 5/0048 370/329 |
| 2015/0327297 A1* | 11/2015 | Nilsson | H04W 72/1215 370/336 |
| 2015/0350949 A1* | 12/2015 | Wang | H04W 16/14 370/230 |

OTHER PUBLICATIONS

Japanese Office Action, Application No. 2015-021050, mailed Mar. 3, 2016, 10 pages.

* cited by examiner

WI-FI SIGNALING BY CELLULAR DEVICES FOR COEXISTENCE IN UNLICENSED FREQUENCY BANDS

PRIORITY CLAIM

The present application claims benefit of priority to U.S. Provisional Application No. 61/936,057 titled "Wi-Fi Signaling by Cellular Devices for Coexistence in Unlicensed Frequency Bands" and filed on Feb. 5, 2014, which is hereby incorporated by reference in its entirety as though fully and completely set forth herein.

FIELD

The present application relates to wireless devices, and more particularly to a system and method for cellular devices to use Wi-Fi signaling in conjunction with cellular communication when performing wireless communication in unlicensed frequency bands.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

In some wireless communication systems, such as certain cellular communication networks, wireless communication is performed on frequency bands which have been licensed (e.g., by a cellular network provider). Additionally, in some wireless communication systems, such as Wi-Fi and Bluetooth wireless communication systems, wireless communication is performed on unlicensed frequency bands, such as the 2.4 GHz ISM frequency band.

SUMMARY

Embodiments are presented herein of methods for cellular devices to use Wi-Fi signaling in conjunction with cellular communication when performing wireless communication in unlicensed frequency bands, and of devices configured to implement the methods.

Since Wi-Fi networks may commonly be deployed on unlicensed frequency bands, this should be accounted for when considering using cellular communication on an unlicensed frequency band. Use of Wi-Fi signaling according to the techniques described herein may represent one possible mechanism to improve coexistence characteristics between cellular and Wi-Fi communication technologies in unlicensed frequency bands.

According to the techniques described herein, a cellular device (e.g., user equipment devices, base stations, etc.) may also be equipped with Wi-Fi communication capabilities. For example, as one possibility an LTE eNodeB might be equipped with a Wi-Fi access point transceiver and baseband chip, enabling it to act as a Wi-Fi access point. As another example, a user device might be equipped with each of cellular radio and Wi-Fi radio communication capabilities.

In conjunction with scheduling a cellular communication between such cellular devices on a frequency channel in an unlicensed frequency band, one or both of those devices may use Wi-Fi signaling to indicate a length of the scheduled cellular communication. For example, the device may utilize its Wi-Fi capabilities to transmit a Wi-Fi preamble and one or more Wi-Fi headers (such as a Wi-Fi PHY layer SIG field) on the frequency channel, which may indicate a transmission length or duration as if the device were performing a Wi-Fi transmission on the frequency channel. Note that the Wi-Fi capabilities of the cellular device (e.g., UE or BS) may be provided by separate Wi-Fi circuitry, or in some instances may be provided by the cellular (e.g., LTE) circuitry of the device. For example, the cellular circuitry may be configured to generate and transmit the Wi-Fi signaling as part of being configured to perform cellular communication in unlicensed frequency bands.

The cellular device may, however, cease transmitting Wi-Fi signals after indicating the transmission length, e.g., to avoid interfering with its own cellular transmission, and may instead perform the scheduled cellular communication. Any Wi-Fi devices receiving such the Wi-Fi signals may have noted the indicated duration of the transmission, and (e.g., according to a carrier sensing collision avoidance algorithm) refrain from performing Wi-Fi communication for the indicated duration. Thus, the likelihood that Wi-Fi transmissions interfering with the cellular communication on the frequency channel will be performed may be greatly reduced.

It should be noted that Wi-Fi devices may also benefit from such a technique being performed by cellular devices operating in the same (or an overlapping) frequency channel. For example, without the Wi-Fi signaling in conjunction with the cellular communication, a Wi-Fi device might attempt a Wi-Fi transmission during the cellular communication, which might not only cause interference to the cellular communication, but also be subject to interference from the cellular communication, which might potentially cause the Wi-Fi transmission to fail. According to the techniques described herein, however, the Wi-Fi device may instead conserve power by refraining from attempting to transmit at a time when the medium is not actually free. Thus, the techniques described herein may (at least in some instances) be beneficial to Cellular-Wi-Fi coexistence from the perspective of both wireless communication technologies.

It should be noted that a variety of implementation details of the techniques described herein may be possible. For example, as will be further described herein subsequently, such Wi-Fi signaling may be performed prior to or simultaneously with the associated cellular communication, according to various embodiments. As an additional example, such Wi-Fi signaling may be used in the case of carrier aggregation (e.g., such that scheduling communications for a cell in an unlicensed frequency band are performed on a different cell (which might be in a licensed frequency band)), or in the case of a standalone cell deployed in an unlicensed frequency band (e.g., such that scheduling communications for the cell are performed on the cell itself).

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
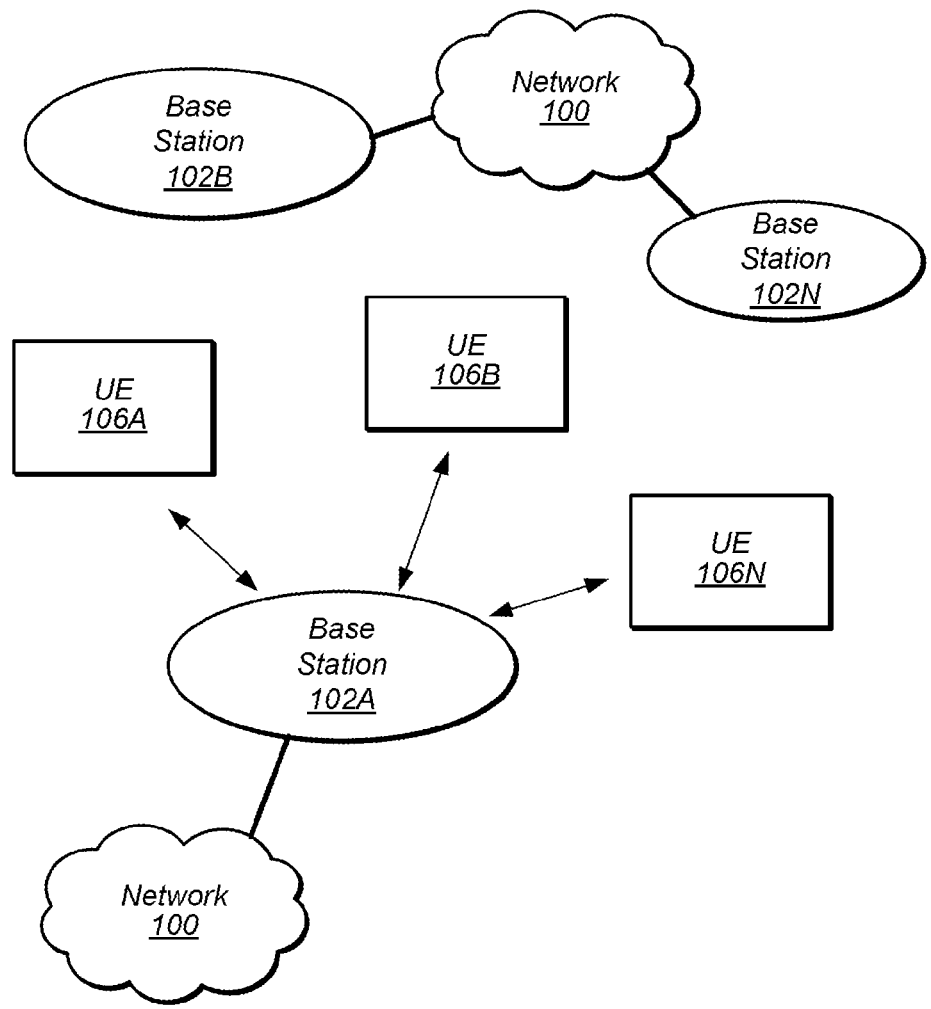
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
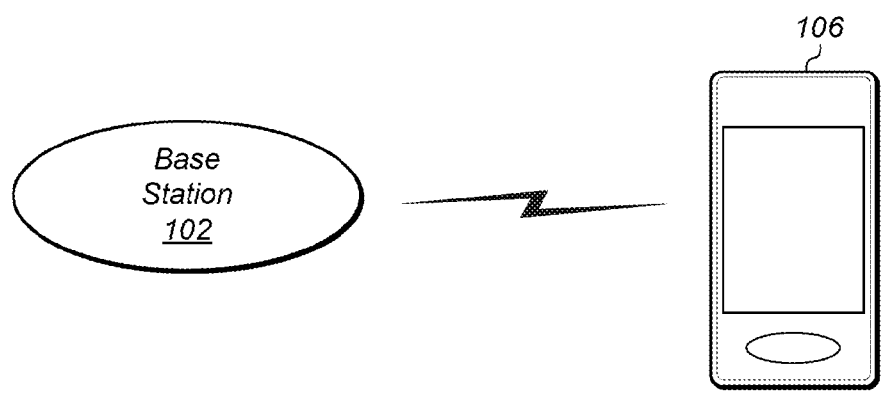
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
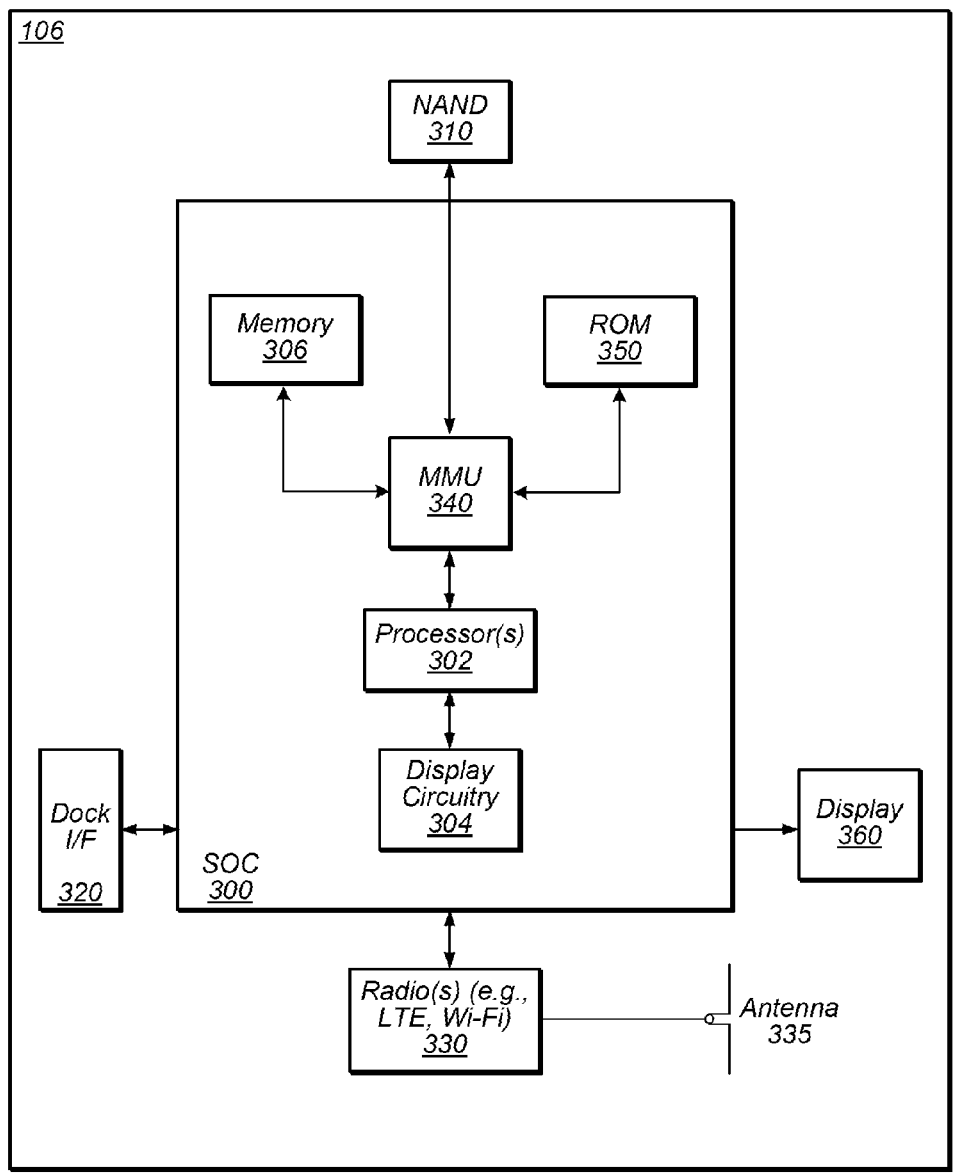
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities), for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for using Wi-Fi signaling or new signaling (e.g., derived from WiFi signaling) in conjunction with cellular communication when performing wireless communication in unlicensed frequency bands, such as those described herein with reference to, inter alia, FIG. 7. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 7.

Figure 4:
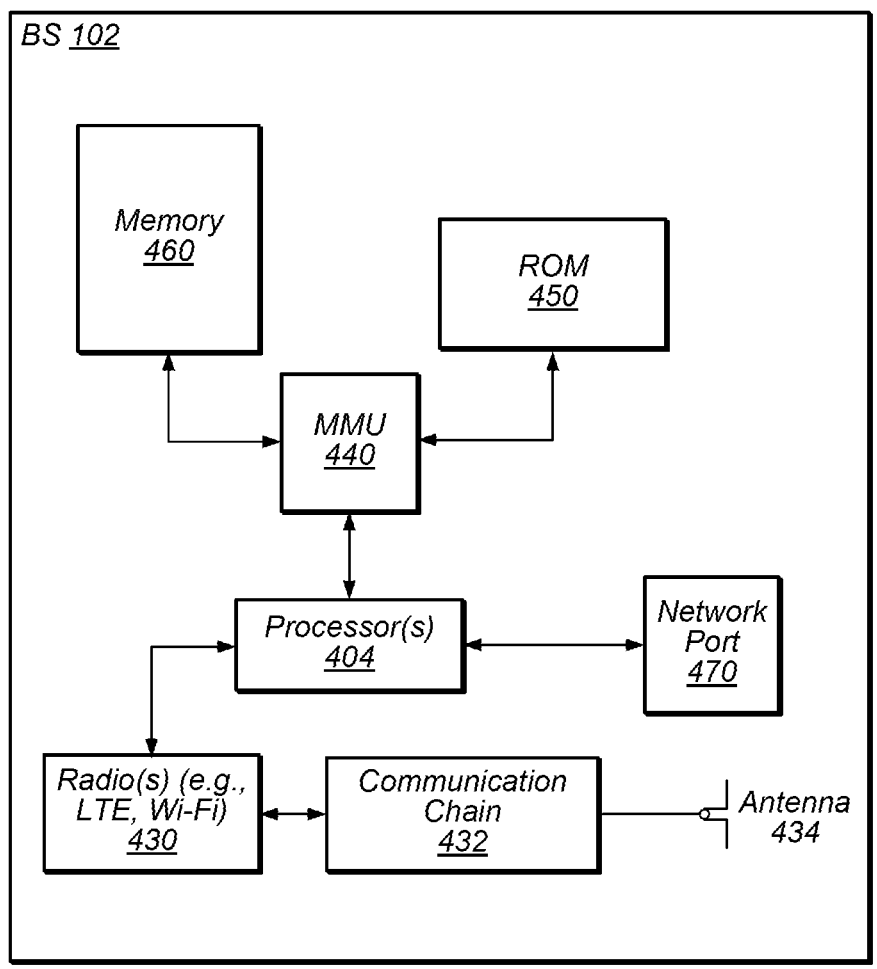
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE (TDD-FDD), LTE in unlicensed spectrum (TDD-FDD) as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

Such capabilities may be particularly useful for managing interference and coordinating communication on unlicensed frequency bands, e.g., on which wireless communication according to multiple wireless communication technologies may be possible (and possibly even common), which the BS 102 may be configured to do. For example, as described further subsequently herein, the BS 102 may include hardware and software components for implementing features for using Wi-Fi signaling or any other (e.g., hybrid LTE-Wi-Fi) preamble in conjunction with cellular communication when performing wireless communication in unlicensed frequency bands, such as those described herein with reference to, inter alia, FIG. 7. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein, such as the features described herein with reference to, inter alia, FIG. 7.

Figure 5:
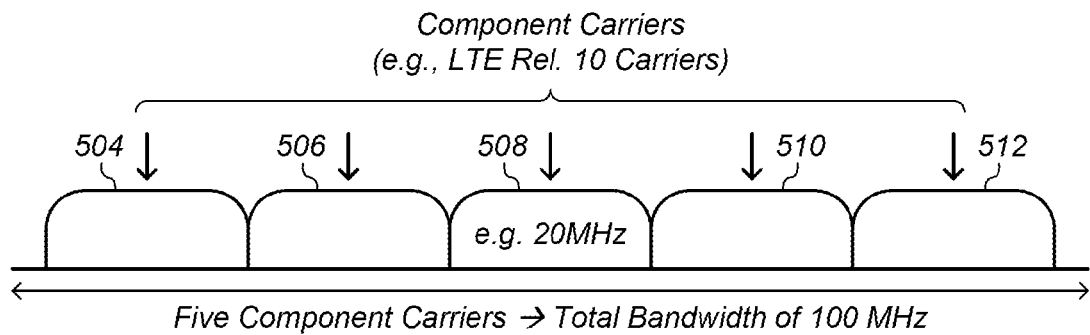
FIG. 5 illustrates an exemplary carrier aggregation scheme, according to some embodiments.

FIG. 5—Carrier Aggregation

Carrier aggregation is a scheme in which multiple carriers (e.g., frequency channels) may be used for wireless communication with a UE according to a wireless communication technology. FIG. 5 illustrates one exemplary carrier aggregation scheme (e.g., which may be used in accordance with the LTE radio access technology) which may be used in accordance with other aspects of this disclosure, such as with respect to the method of FIG. 7.

In the illustrated scheme, up to five component carriers (carriers 504, 506, 508, 510, 512) may be aggregated for a single user device (such one of the UEs 106 illustrated in and described with respect to FIGS. 1-3). Each component carrier may use a channel width of up to 20 MHz. As one possibility, each component carrier may be an LTE release 10 carrier. Thus, according to the exemplary scheme, a UE may be allocated up to 100 MHz of bandwidth. In many instances, such a carrier aggregation scheme may enable a UE participating in it with greater throughput than without such a scheme.

In many cases, component carriers may utilize adjacent frequency channels. However, it should be noted that it is also possible to implement carrier aggregation utilizing non-continuous frequency channels, potentially including non-continuous frequency channels within the same frequency band, and/or frequency channels within different frequency bands. For example, it may be possible to implement carrier aggregation using a frequency channel in a licensed frequency band as one component carrier, and a frequency channel in an unlicensed frequency band as another component carrier.

It should be noted that while the exemplary scheme illustrated in FIG. 5 and the associated description are provided by way of example as one possible manner of implementing carrier aggregation, they are not intended to be limiting to the disclosure as a whole. Numerous alternatives to and variations of the details thereof are possible and should be considered within the scope of the present disclosure. For example: carrier aggregation schemes may be implemented in conjunction with other wireless communication technologies; carriers according to other LTE releases or other radio access technologies altogether may be used; carriers having different channel widths may be used; different numbers of component carriers may be supported; and/or any of numerous other alternatives to and variations of the illustrated scheme are also possible.

Figure 6:
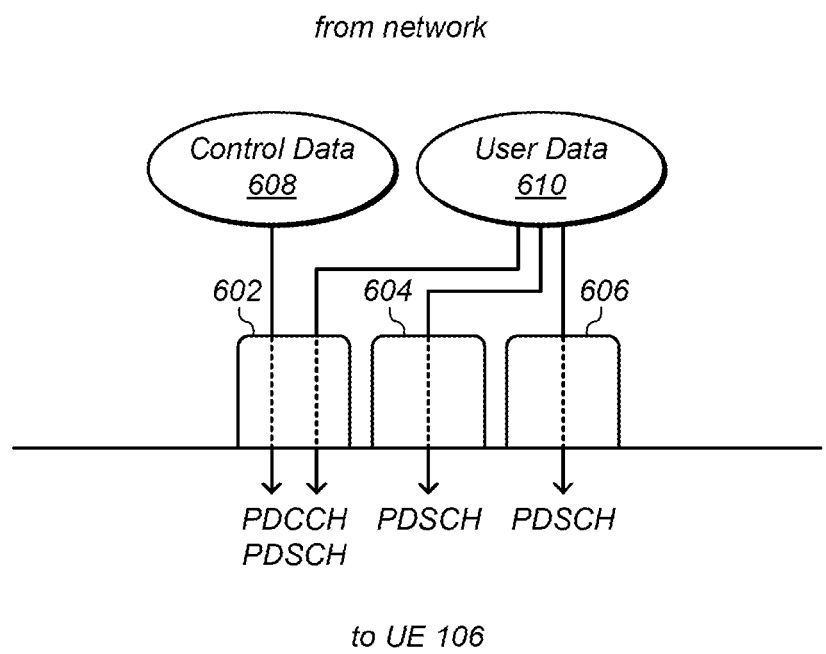
FIG. 6 illustrates an exemplary cross-carrier scheduling scheme, according to some embodiments.

FIG. 6—Cross-Carrier Scheduling

For systems which implement carrier aggregation, various control schemes/mechanisms are possible. As one possibility, an independent cell may be implemented on each component carrier, for example by providing a control channel with data scheduling and other control features for each cell on the component carrier for that cell. As another possibility, some or all control functions may be centralized. For example, a "primary cell" might be implemented on one ("primary") component carrier, while "secondary cells" might be implemented on any additional ("secondary") component carriers, such that some or all control information for the secondary cells is communicated by way of the primary cell.

Such a scheme may be referred to as "cross-carrier scheduling", and FIG. 6 illustrates one such exemplary scheme (e.g., which may be used in accordance with the LTE radio access technology). It should be noted that while the exemplary scheme illustrated in FIG. 6 and the associated description are provided by way of example as one possible manner of implementing a cross-carrier scheduling mechanism, they are not intended to be limiting to the disclosure as a whole. Numerous alternatives to and variations of these exemplary details are possible and should be considered within the scope of the present disclosure.

As shown, in the exemplary scheme a user device (e.g., a UE 106 such as illustrated in and described with respect to FIGS. 1-3) may have three active carriers as part of its connection to a network (e.g., by way of one or more base stations 102 such as illustrated in and described with respect to FIGS. 1-2 and 4), which may be implemented as a primary cell 602 and two secondary cells 604, 606. The network may provide control data 608 (e.g., for scheduling user data communications, performing mobility related functions, etc.) for all three cells by way of a control channel of the primary cell 602. For example, the control data 608 may be communicated by way of a physical downlink control channel (PDCCH) of the primary cell 602.

The network may provide user data 610 (e.g., application data for networking applications such as web browser applications, email applications voice call applications, video chat applications, game applications, etc.) to the UE 106 on any or all of the cells 602, 604, 606. For example, various portions of the user data 610 may be communicated by way of a physical downlink shared channel (PDSCH) of each of the primary cell 602 and the secondary cells 604, 606.

Thus, cross-carrier scheduling may be used in conjunction with carrier aggregation to centralize (at least a portion of) control communications on one cell. This technique may be used in many instances for infrastructure mode communications between a UE and a network, such as illustrated in the exemplary scheme of FIG. 6. Such a technique may be particularly useful if different component carriers are known and/or expected to have different interference levels, since in such a case the carrier having the lowest interference level may advantageously be used for high priority control data. Such a situation may be the case, for example, if one component carrier is on a licensed frequency band for which the potential for interference is substantially limited to that caused by network controlled wireless communication, while another component carrier is on an unlicensed frequency band which may be subject to interference caused by wireless communication which is not under network control.

Figure 7:
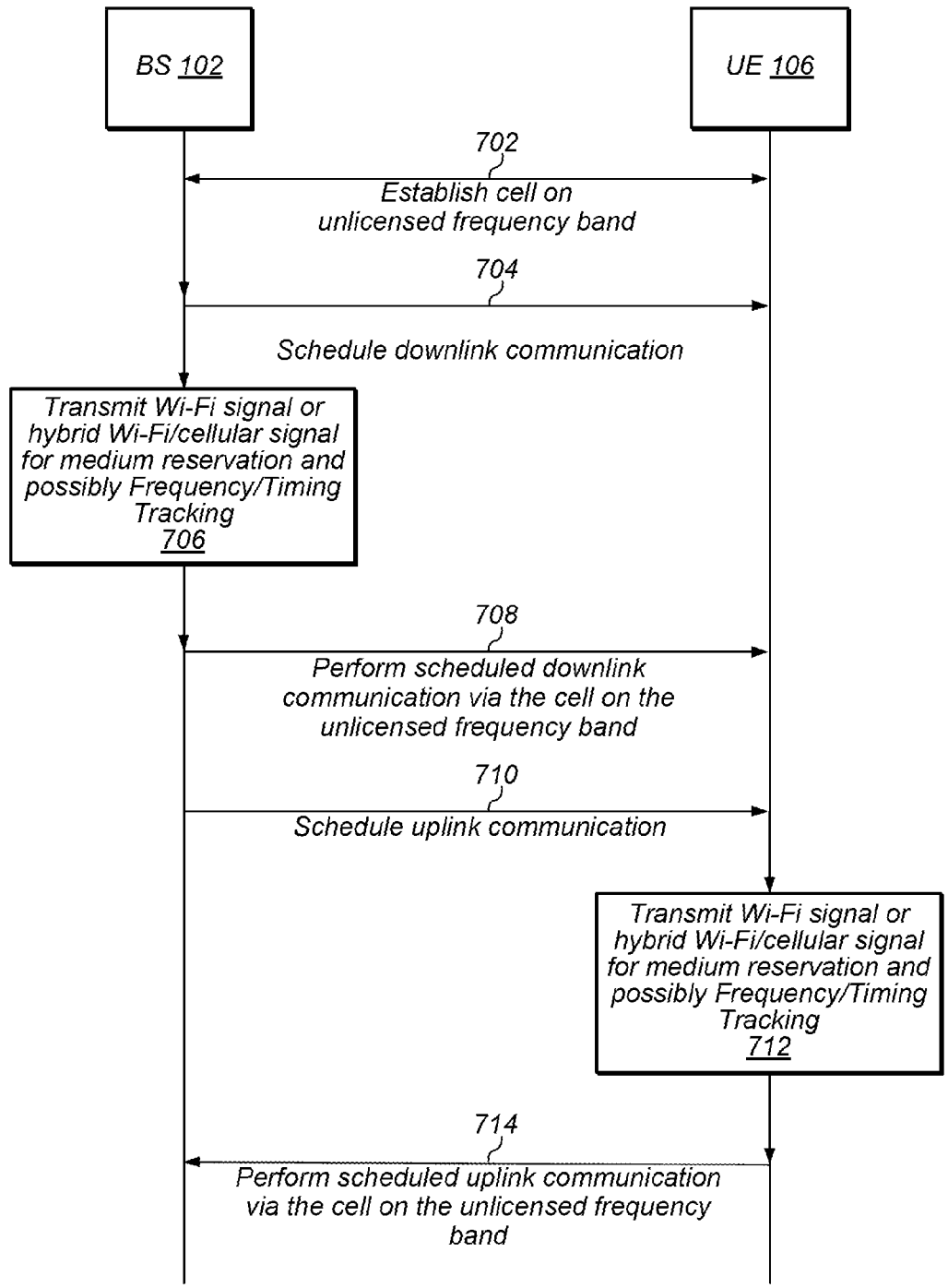
FIG. 7 is a communication flow diagram illustrating an exemplary method for using Wi-Fi signaling in conjunction with cellular communication in unlicensed frequency bands, according to some embodiments.

FIG. 7—Communication Flow Diagram

FIG. 7 is a communication/signal flow diagram illustrating a scheme/method for supporting efficient coexistence between LTE and Wi-Fi communications in unlicensed frequency bands. Aspects of the method of FIG. 7 may be implemented by a BS 102 (e.g., such as illustrated in and described with respect to FIGS. 1-2 and 4), and by a UE 106 (e.g., such as illustrated in and described with respect to FIGS. 1-3), or more generally in conjunction with any of the computer systems or devices shown in the above Figures, among other devices, as desired.

In various embodiments, some of the elements of the method shown may be performed concurrently, in a different order than shown, or may be omitted. Additional elements may also be performed as desired. As shown, the method may operate as follows.

In 702, a cell may be established on a frequency channel in an unlicensed frequency band. The cell may be established between a cellular base station (BS) and a wireless user equipment (UE) device. The cell may be established according to a first wireless communication technology (or "radio access technology" or "RAT"), such as LTE.

The cell may be a stand-alone cell, or may be a cell formed as part of a carrier-aggregation communication link between the BS and the UE. In the case of a stand-alone cell, both control communications and data communications for the cell may be performed communications on the frequency channel on which the cell is established.

If the cell is formed as part of a carrier aggregation communication link, it may be the case that the cell is a "secondary carrier" or "secondary cell", which may be formed in addition to (e.g., subsequent to) a "primary carrier" or "primary cell".

For example, a primary carrier may be established (e.g., configured) between the BS and the UE. The primary carrier may also be established according to the first wireless communication technology. The primary carrier may be established on a frequency channel in a licensed frequency band, which may also be referred to herein as a "first frequency band". For example, a cellular network provider may have licensed a particular frequency band (possibly specifically for use in conjunction with a particular radio access technology, such as LTE-A, LTE, WCDMA, CDMA2000, GSM, etc.), and may provide a cellular network which operates primarily within that licensed frequency band. Such a licensed frequency band may be subject to less external interference than the unlicensed frequency band. For example, the unlicensed frequency band might be subject to interference from other wireless communication technologies and/or from other cellular network operators utilizing a similar or the same wireless communication technology in the unlicensed frequency band, whereas a licensed frequency band may not be subject to such external interference sources, e.g., if the licensed frequency band is licensed for the exclusive use of one particular cellular network provider.

In such a case, the primary carrier may provide the UE with an infrastructure mode type communication link to a cellular network. Thus, the primary carrier may provide a connection to a core network, e.g., of a cellular service provider, with which a user of the UE may have a subscription and/or other agreement to provide cellular service. The cellular network may thus provide connectivity between the user device and various services and/or devices coupled to the cellular network, such as other user devices, a public switched telephone network, the Internet, various cloud-based services, etc. The primary carrier may be used for control communications between the UE and the BS in such a case, if desired, and may also be used for data (e.g., user data) communications.

Note that as part of such a cellular network, the BS may operate in conjunction with numerous other base stations (which may provide other cells) and other network hardware and software to provide continuous (or nearly continuous) overlapping wireless service over a wide geographic area. At least in some instances, the UE may select a cell with the BS to establish as the primary cell from among multiple cells within wireless communication range of the UE, which may be provided by nearby base stations. For example, the UE may be capable of discovering, detecting signals from, and possibly communicating with some or all of multiple neighboring cells, e.g., depending on signal strength/quality, permission, technological interoperability, etc. The primary cell may be selected and configured/established on the basis of one or more signal strength and/or signal quality measurements of the primary cell and/or other nearby cells, among other possible criteria (e.g., wireless traffic congestion of the cell(s), operator of the cell(s), wireless technology according to which the cell(s) operate, etc.).

Note further that cell selection may be an initial cell selection, e.g., upon powering on the UE 106 (or possibly after powering on a radio of the UE, e.g., upon exiting a limited-operation or "airplane mode"), according to some embodiments. Alternatively, the cell selection may be part of a cell re-selection procedure. For example, the UE might perform a cell re-selection procedure to select a new cell with better signal strength and/or quality as a primary cell based on experiencing degraded signal strength and/or quality on a previous primary cell, e.g., as a result of moving from a service area of the previous primary cell to a service area of the new primary cell.

Establishing the cell on the unlicensed frequency band may include scanning channels of the unlicensed ("second") frequency band, (which may be an industrial-scientific-medical (ISM) frequency band, as one example), e.g., for interference. As previously noted, since unlicensed frequency bands may be subject to interference from other wireless communication (e.g., potentially from one or more other wireless communication technologies) which is not under network control, it may be desirable to determine how much interference is currently present on each of the channels in the unlicensed frequency band prior to selecting one for use as a carrier.

In particular, at least in some instances it may be desirable to check for Wi-Fi interference, e.g., if the unlicensed frequency band is one in which Wi-Fi communication is known to be performed. Thus the BS (or the Wi-Fi device controlled by and/or coupled to the BS) may scan one or more channels (e.g., Wi-Fi and/or radar channels) on the unlicensed frequency band. The BS may be equipped with (or coupled to and in control of) Wi-Fi and hybrid Wi-Fi/cellular communication circuitry (e.g., may be configured to act as a Wi-Fi access point, or may be coupled to and control a Wi-Fi access point, or may include a hybrid Wi-Fi/cellular module enabling hybrid signaling) specifically for such a purpose (and/or for other purposes), if desired. Scanning the channels may include measuring any of various channel condition metrics and/or metrics which may be used to gauge or infer interference levels, such as RSSI. As one possibility, the BS may perform power spectrum density detection on such an unlicensed frequency band. As a further possibility, the BS may detect energy in a particular channel by using its RF front end, such that the energy detection is agnostic of the technology used in that particular channel. In such a case, as long as the energy (RSSI) detected is higher than a certain threshold (e.g. RSSI>−80 dBm, or any other desired threshold) then the particular channel (ISM frequency) may be assumed to be occupied (i.e., non-interference free).

Based on scanning the (e.g., Wi-Fi) channels in the unlicensed frequency band, the BS may select one or more channels (e.g., Wi-Fi channels, or other unlicensed spectrum channels according to the first wireless communication technology (such as LTE channels) which may correspond/overlap in frequency with one or more of the Wi-Fi channels) in the unlicensed frequency band as potential channels on which to establish a carrier. The selected channel(s) may be those on which Wi-Fi interference has been determined to be less likely and/or prevalent, such as channels for which RSSI are below a desired threshold.

Having selected one or more channels as potential carriers for the cell in the unlicensed frequency band, the BS may provide an indication of such channels to the UE. For example, the BS may generate and provide a list of potential channels in the unlicensed frequency band to the UE in a configuration message (e.g., an RRC configuration object) via the primary cell, in a carrier aggregation scenario. The UE may store such a list of potential channels and configure each channel on the list as a potential carrier, though each remain 'inactive' and unused as an actual carrier until more explicitly activated.

The UE may additionally provide feedback to the BS (e.g., via the primary cell) with respect to such a list of potential channels in the unlicensed frequency band, in such a scenario. For example, the UE may perform one or more measurements (e.g., on interference/signal strength/RSSI scans/any of various other channel condition metrics) on some or all of the potential channels to determine channel conditions for those channels local to the UE, e.g., to confirm that those channels are also relatively free of interference in the vicinity of the UE. As another example, the UE may have limits to its wireless communication capabilities, as a result of which it may not be possible to perform communications according to the first wireless communication technology on a particular frequency band, potentially including one or more of the potential channels indicated by the BS. Thus, the UE 106 might provide channel condition information, a pruned (or unpruned) list of supported channels, a list of unsupported channels, and/or any of various other forms of feedback to the BS with respect to the list of potential channels in the unlicensed frequency band.

Once any scanning/channel measurements have been performed by the BS, and possibly based additionally on any feedback received from the UE, then the BS 102 may select the frequency channel in the unlicensed frequency band on which to establish the cell. The selection may be based on one or more of the scanning/channel measurements, any feedback received from the UE, and/or network resource allocation considerations (e.g., known loading/use of network controlled communications, resource availability, etc.), among various possibilities.

If the cell in the unlicensed frequency band is a secondary cell in a carrier aggregation scheme, the BS may activate the secondary carrier by providing an indication the UE to establish the secondary carrier on the second channel, e.g., via a configuration message (such as a "Scell Add" configuration message in LTE) transmitted on the primary carrier. Alternatively, if the cell in the unlicensed frequency band is a stand-alone cell, the cell may be established between the BS and the UE as an initial cell selection (e.g., in which the UE attaches to the cell) or via a (e.g., network guided) cell-reselection process.

In 704, a downlink communication with the UE may be scheduled on the cell in the unlicensed frequency band. Note that at least in some instances, the BS may perform an energy sensing operation to ensure the medium availability before performing the resource scheduling. The BS may, for example, only schedule the downlink communication if the medium is available; if the medium is busy, the scheduling may be delayed (e.g., until such a time as the medium is available).

As one possibility, an indication of the scheduled downlink communication may be provided to the UE by way of a control channel (e.g., the PDCCH in LTE) provided as part of the cell.

Alternatively, as previously noted, in some instances (e.g., if the cell in the unlicensed frequency band is a secondary cell as part of a carrier aggregation scheme) the cellular network may utilize cross-carrier scheduling to schedule/allocate secondary cell resources to the UE. For example, in such an instance the BS may provide scheduling information (e.g., uplink and/or downlink grants) for scheduling secondary cell resources to the UE via the primary carrier. Using cross-carrier scheduling in such a scenario may enable the network to keep control communications on the licensed frequency band, which as previously noted with respect to FIG. 6, may be subject to less (or at least less external) interference than the unlicensed frequency band.

In 706, in order to reserve the medium, the BS may transmit a Wi-Fi signal, or a hybrid Wi-Fi/cellular signal on the frequency channel (or on a Wi-Fi channel corresponding in frequency) of the cell in the unlicensed frequency band in conjunction with the scheduled downlink communication. As previously noted, the BS may be equipped with (or communicatively coupled with) Wi-Fi communication circuitry, e.g., to facilitate transmission of such a signal by the BS, among various reasons. Alternatively, note that the Wi-Fi signal may be incorporated to the LTE protocol, if desired; for example, it might be appended to the LTE transmission. Note further that in such a case the BS might not need a Wi-Fi transceiver, as the Wi-Fi or hybrid Wi-Fi/ cellular signal may be generated and transmitted by LTE circuitry and transceiver of the BS.

Note that if desired, this Wi-Fi or hybrid Wi-Fi/cellular signal could be used for unlicensed LTE frequency and timing tracking as well as for medium reservation.

The Wi-Fi signal may indicate a length of the scheduled downlink communication using Wi-Fi signaling. For example, as one possibility, the Wi-Fi signal may include a Wi-Fi preamble and signal (SIG) field indicating a number of orthogonal frequency division multiplexing (OFDM) symbols corresponding to the length of the scheduled downlink communication. More generally, the Wi-Fi signal may be in any appropriate format which is specified by the Wi-Fi wireless communication technology and/or recognized by Wi-Fi devices. In some instances, the Wi-Fi signal may also or alternatively include a Wi-Fi request-to-send (RTS) and/or clear-to-send (CTS) message. As a still further possibility (e.g., for cellular frequency/timing tracking), the signal may contain a LTE based discovery reference signal CSI-RS, if desired.

Transmitting the Wi-Fi signal or hybrid signal indicating the length of the scheduled downlink communication may help prevent Wi-Fi devices from transmitting during the scheduled downlink communication, which could cause interference. For example, any Wi-Fi devices detecting and decoding the Wi-Fi signal transmitted by the BS may determine that the medium will be occupied for the indicated length of time/number of OFDM symbols, and accordingly refrain from transmitting until the indicated length of time/number of OFDM symbols has passed, even if the downlink communication itself (which may be performed according to LTE or another RAT which Wi-Fi radios may not be capable of detecting and/or decoding) is not detected by the Wi-Fi devices' PHY sensing mechanisms.

The Wi-Fi or hybrid signal may be transmitted prior to, or possibly partially or entirely temporally overlapping with, the scheduled downlink communication. Note, however, that if any portion of the Wi-Fi signal is transmitted concurrently with the scheduled downlink communication, it may be helpful to deploy interference management/mitigation techniques to avoid interference to the scheduled downlink communication caused by transmission of the Wi-Fi signal.

Note that the length indicated by the Wi-Fi signal may include all or just a portion of a scheduled downlink communication. For example, if a downlink communication is expected (e.g., based on RRC buffer levels in an LTE scenario) to span multiple transmission time intervals, a Wi-Fi signal indicating the expected (e.g., plural) number of TTIs could be transmitted at the beginning of that set of TTIs. Alternatively, a Wi-Fi signal indicating a length corresponding to a single TTI could be provided in conjunction with each TTI in which downlink communication is scheduled.

In addition to generating and transmitting the Wi-Fi or hybrid signal to avoid interference to the scheduled downlink communication, note that at least in some instances the BS (and possibly the UE) may also monitor the wireless medium of the cell in the unlicensed frequency band for Wi-Fi signals prior to performing the scheduled downlink communication. For example, in some instances other Wi-Fi devices or cellular devices (e.g., other BSs or UEs) configured to operate in the unlicensed frequency band may already be communicating, or may attempt to communicate, at the same time as the BS and the UE. Accordingly, the BS (and possibly the UE) may monitor or listen to the wireless medium in order to determine whether it is busy (occupied) or free (unoccupied). If the medium is busy, the BS may delay (not perform) the scheduled downlink communication in order to avoid interfering (causing a collision) with the detected use of the medium, while if the medium is free, the BS may go ahead with the scheduled downlink communication.

In 708, the scheduled downlink communication may be performed. This may include communication of downlink data from the BS to the UE via the cell on the unlicensed frequency band according to the scheduling configured by the BS. The data communicated may include any of a variety of types of data, including user data (e.g., application data for a web-browser, mapping application, email client, media streaming application, game, or any of various other types of applications), background data (e.g., software updates), etc.

Note that in some instances, such as certain carrier aggregation schemes, a secondary cell may not be used for uplink communications. However, if the cell in the unlicensed frequency band is used for uplink communications (e.g., because it is a stand-alone or primary cell, or it is a secondary cell in a carrier aggregation scheme in which uplink communication is enabled), similar techniques may be implemented for uplink communication from a UE to a BS, if desired. Steps 710-714 of FIG. 7 relate to such techniques.

In 710, an uplink communication via the cell may be scheduled between the BS and the UE. Similar to the scheduled downlink communication, an indication of the scheduled uplink communication may be provided to the UE, for example by way of a control channel (e.g., the PDCCH in LTE) provided as part of the cell. Alternatively, (e.g., if the cell in the unlicensed frequency band is a secondary cell as part of a carrier aggregation scheme) cross-carrier scheduling may be used, such that the indication of the scheduled uplink communication may be provided via a different (e.g., the primary) cell.

In 712, the UE may transmit a Wi-Fi signal or hybrid Wi-Fi/cellular signal on the frequency channel (or on a Wi-Fi channel corresponding in frequency) of the cell in the unlicensed frequency band in conjunction with the scheduled uplink communication. The UE may be equipped with Wi-Fi communication circuitry, e.g., to facilitate transmission of such a signal by the UE, among various reasons; alternatively, and as similarly noted above for the case of the BS, if the signal is part of the LTE protocol, the Wi-Fi or hybrid Wi-Fi/cellular signal may be generated and transmitted by cellular (e.g., LTE) circuitry of the UE, in which case a Wi-Fi transceiver might not be needed by the UE for this purpose. Similar to the Wi-Fi signal or hybrid Wi-Fi/cellular signal transmitted by the BS in step 706, this Wi-Fi or hybrid Wi-Fi/cellular signal could also be used for unlicensed LTE frequency and timing tracking as well as for medium reservation, if desired.

The Wi-Fi signal may indicate a length of the scheduled uplink communication using Wi-Fi signaling. For example, as one possibility, the Wi-Fi signal may include a Wi-Fi preamble and signal field indicating a number of orthogonal frequency division multiplexing (OFDM) symbols corresponding to the length of the scheduled uplink communication. More generally, as in the downlink scenario, the Wi-Fi signal may be in any appropriate format which is specified by the Wi-Fi wireless communication technology. In some instances, the Wi-Fi signal may also or alternatively include a Wi-Fi request-to-send (RTS) and/or clear-to-send (CTS) message. The Wi-Fi signal may be transmitted prior to, or possibly partially or entirely temporally overlapping with, the scheduled uplink communication.

Note that much as in the case of the scheduled downlink communication, in the case of the scheduled uplink communication, it may also be the case that in addition to generating and transmitting the Wi-Fi or hybrid signal to avoid interference to the scheduled uplink communication, the UE (and possibly the BS) may also monitor the wireless medium of the cell in the unlicensed frequency band for Wi-Fi signals prior to performing the scheduled uplink communication. Thus, the UE (and possibly the BS) may monitor or listen to the wireless medium in order to determine whether it is busy or free. If the medium is busy, the UE may delay the scheduled uplink communication in order to avoid interfering with the detected use of the medium, while if the medium is free, the UE may go ahead with the scheduled uplink communication.

In 714, the scheduled uplink communication may be performed. This may include communication of uplink data from the UE to the BS via the cell on the unlicensed frequency band according to the scheduling configured by the BS. The data communicated may include any of a variety of types of data, including user data, background data, etc.

Thus, according to the scheme of FIG. 7, a BS and a UE may utilize Wi-Fi signaling to provide an indication of the length of scheduled communications via a cellular communication technology such as LTE on an unlicensed frequency band. Such techniques may facilitate efficient co-existence between Wi-Fi and a cellular communication technology which implements such techniques, as it may prevent conflicts between cellular devices (e.g., BSs and UEs) and Wi-Fi radios which detect such Wi-Fi signaling indications of the length of scheduled cellular communications and which might otherwise attempt to transmit (and thus potentially interfere) during such scheduled cellular communications.

Note additionally that elements of the method may be expanded and/or repeated as desired such that any number of (uplink and/or downlink) cellular communications may be performed between a BS and a UE with protection from interference provided by way of Wi-Fi signaling of the length of such communications by the BS and/or the UE.

FIGS. 8-16—Additional Information

FIGS. 8-16 and the information provided herein below in conjunction therewith are provided by way of example of various considerations and details relating to possible systems in which the method of FIG. 7 may be implemented, and are not intended to be limiting to the disclosure as a whole. Numerous variations and alternatives to the details provided herein below are possible and should be considered within the scope of the disclosure.

As previously noted, an operator of an LTE network may use a primary carrier (Pcell) to schedule LTE data in a normal way, and a second carrier (Scell) may be added for communications through an LTE RAT in an ISM Band or unlicensed Band. Such LTE Communications in the Scell would need to avoid Wi-Fi interference in order to be successful.

As part of this, an LTE eNB providing a cell in an unlicensed band (an "LTE-U eNB") may pick a channel in an ISM band that has an acceptable level of interference on which to provide the cell. Furthermore, it may be desirable to provide a way for the LTE-U eNB to may make sure that when communications are scheduled in that channel, there is no sudden bursty Wi-Fi communication that will degrade the performance of the communication in LTE Scell.

As an additional consideration, it may be desirable for such an LTE-U eNB to have a muting scheme (On/Off mechanism) to allow Wi-Fi devices to access the channel without LTE interference. Furthermore, it may be desirable to implement techniques which facilitate Wi-Fi devices ability to detect LTE-U communications. For example, such muting mechanisms (LTE) and DFS mechanisms (Wi-Fi) may not be able to operate correctly if Wi-Fi devices/access points (APs) are not able to sense/detect LTE-U communications efficiently.

In other words, broadly speaking, mechanisms to enable coexistence between Wi-Fi and LTE-U in unlicensed bands may be necessary in order to implement such a scheme.

Wi-Fi may use a random access mechanism to schedule communications. In addition, Wi-Fi includes a mechanism to control contention on the channel medium. PHY sensing in 802.11 may allow a Wi-Fi device to detect the preamble and the signal field in the PHY frame structure, and to sense Wi-Fi communications that have an RSSI between −82 dBm and −62 dBM. If the medium is busy (e.g., as determined based on the PHY sensing of the preamble and the signal field and/or the signal strength of Wi-Fi communications), the Wi-Fi device may wait until the current transmission is finished. The length which the Wi-Fi device waits can either be based on/detected from the MAC network allocation vector (NAV) value (which may give the duration including the ACK) or the preamble and signal field (which may indicate the number of OFDM symbols for data transmission, but may not contain the length of the ACK signal).

Figure 8:
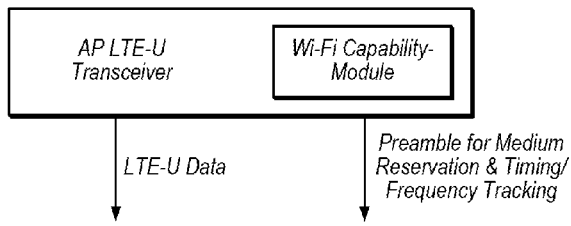
FIG. 8 illustrates an exemplary LTE-U access point with a Wi-Fi capability module, according to some embodiments.

Such existing Wi-Fi contention and random access control mechanisms may be leveraged to also facilitate efficient LTE and Wi-Fi co-existence. For example, a LTE-U eNB may be equipped with a Wi-Fi device (an access point transceiver and BB chip). Note that as an additional possibility, in some instances an eNB may be equipped with a chipset specifically configured for LTE use in unlicensed spectrum, which may include a Wi-Fi capability module, which may avoid the need for a separate Wi-Fi chipset. FIG. 8 illustrates such an exemplary "LTE-U access point", according to some embodiments. As shown, such a device may include a LTE-U transceiver capable of transmitting and receiving LTE-U data, as well as a Wi-Fi capability module, which may provide partial or full Wi-Fi communication capabilities and may enable the LTE-U AP to transmit Wi-Fi signals and/or hybrid Wi-Fi/LTE signals (e.g., preambles) for medium reservation, timing and/or frequency tracking (e.g., discovery reference signals or DRS), and/or other purposes.

Thus, at least in some instances, a Wi-Fi module or device (which may be any combination of hardware, software, firmware, etc.) may be able to scan all Wi-Fi channels in the band of interest and report their RSSI and link quality metrics to the LTE-U eNB/AP. Once these measurements are available at the LTE eNB, it may determine a list of potential channels that are not "polluted" by Wi-Fi communications in order to establish LTE communications in Scell.

Wi-Fi channel measurements may be performed once (e.g., initially) to populate a list of "good" Wi-Fi channels, and can also/alternatively be performed periodically after or before every scheduled data communication to make sure that the conditions are still favorable for a successful LTE communication.

To further facilitate co-existence, the LTE-U eNB may be capable of operating using an On/Off mode. For example, the LTE-U eNB might transmit for a period of time (which may be statically defined by the 3GPP specification documents, semi-statically defined by network configuration, or dynamically determined based on interference, traffic load, etc.) and then go mute/silent for another period. The lengths of time during which the LTE-U eNB is 'on' and 'off' may be any of various length of time, and may be equal or unequal. For example, each 'on' periods and/or each 'off' period might be 10 ms, 15 ms, 20 ms, 30 ms, 40 ms, or any other desired value.

To enable the Wi-Fi devices and Wi-Fi APs to sense LTE-U communications, and since the LTE-U eNB is equipped with a Wi-Fi device or module, a LTE-U eNB may transmit a Wi-Fi preamble+signal field before scheduling a communication in the Scell.

The preamble+signal field may be transmitted ahead of any scheduled LTE-U transmission, and repeated as necessary. For example, the preamble+signal could be sent prior to of each TTI (which may have a duration of 1 ms) and the number of Wi-Fi OFDM symbols indicated in the signal field may correspond to 1 ms. Alternatively, the preamble and signal transmission may temporally overlap with (e.g., the beginning of) the TTI to make sure Wi-Fi devices are not accessing the medium.

The frequency at which the preamble+signal field is sent may be adjusted to the typical length of a transmission in Wi-Fi (e.g., a few ms). Further Wi-Fi preamble+signal transmissions may be performed (retransmitted) by the LTE-U eNB based on the length of data put in the SIG field (i.e., the number of OFDM symbols indicated), if further LTE-U transmissions are scheduled. This may restrain any Wi-Fi device/AP from accessing the medium/channel and may guarantee or at least improve the likelihood of a clear channel for Scell LTE communication. When LTE-U is off, a Wi-Fi device not detecting any preamble may be able to access the channel.

Figure 9:
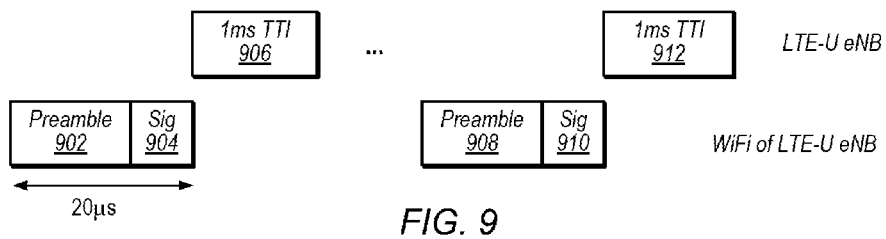
FIGS. 9-10 illustrate possible transmission schemes for using Wi-Fi signaling in conjunction with cellular communication in unlicensed frequency bands, according to some embodiments.
Figure 10:
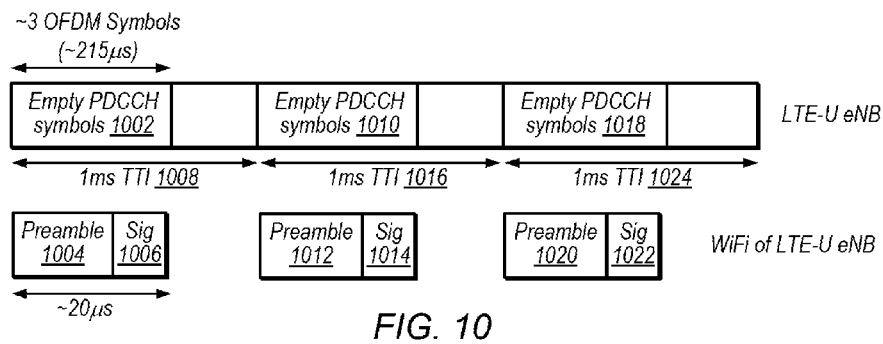

FIGS. 9-10 illustrate possible transmission schemes. It should be noted that block sizes are not drawn to scale with respect to the time duration of those blocks in the illustrated schemes of FIGS. 9-10.

FIG. 9 illustrates a scheme in which preamble 902, 908 and signal 904, 910 fields may be transmitted prior to LTE-U communications (e.g., TTIs 906, 912) by a Wi-Fi device of an LTE-U eNB, and in which the preamble+signal field indicates a transmission length (i.e., a number of OFDM symbols) corresponding to one or more TTIs. Such a scheme may be beneficial, for example, in a stand-alone LTE-U cell in which the preamble+signal field transmission represents overhead during which no LTE communications are performed.

Alternatively, in case multiple TTIs are scheduled in an LTE-U cell adjacent to each other, instead of sending a single preamble+signal transmission containing information indicating that the length of the scheduled data transmission is multiple ms (which may not correspond to realistic data transmission lengths for Wi-Fi, whose average transmission may be on the order of 3 ms), the LTE-U eNB may use the PDCCH OFDM symbols of each TTI to trigger the Wi-Fi entity to send the preamble+sig. FIG. 10 illustrates a such scheme.

Such a scheme may be convenient for carrier aggregation implementations in which cross-carrier scheduling is used, such that the Pcell is used to send control/scheduling information for both the Pcell and the Scell; in such a case, the portion of the LTE frame structure dedicated to the PDCCH on the Scell may be empty (empty PDCCH symbols 1002, 1010, 1018), and use of that timeframe to transmit the preamble 1004, 1012, 1020 and signal 1006, 1014, 1022 fields on a per TTI 1008, 1016, 1024 basis may not interfere with LTE communications. For example, in many instances, the PDCCH may occupy 3 OFDM symbols, which may approximately correspond to 215 µs. This may be sufficient to accommodate the Preamble+signal field (which may be approximately 20 µs), and also RTS/CTS signaling if desired or needed.

It may be possible, and in many cases desirable, for any LTE-U devices (e.g., including user devices) that support communication in unlicensed spectrum to use similar mechanisms. For example, in the case of a stand-alone LTE-U eNB, LTE-U devices may perform uplink (UL) communications in addition to downlink (DL) communications.

Figure 11:
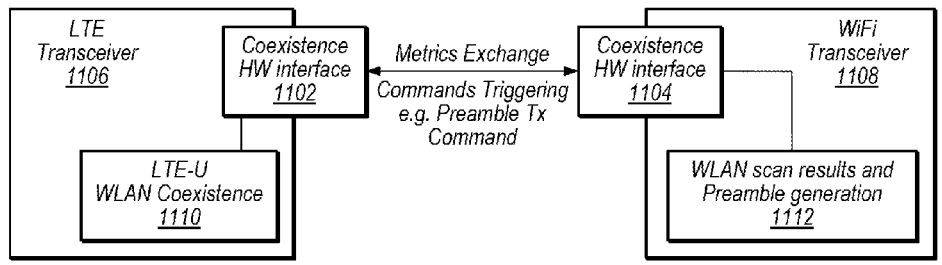
FIG. 11 illustrates an exemplary coexistence interface between LTE and Wi-Fi in a wireless device, according to some embodiments.

Because of inter-device coexistence issues (e.g., as specified by 3GPP), the LTE-U devices may use a coexistence interface 1102, 1104 (e.g., as illustrated in FIG. 11) to send commands from an LTE-U-WLAN coexistence module 1110 in their LTE transceivers 1106 to a module 1112 in their Wi-Fi transceivers 1108 to generate and transmit a Wi-Fi preamble. This interface may be able to account for/correct any timing difference between the LTE transceiver 1106 and Wi-Fi transceiver 1108. Alternatively, in an integrated IC (e.g., a combined LTE+Wi-Fi chip), both transceivers may be driven by the same clock, which may effectively mitigate or altogether negate any potential timing issues.

Figure 12:
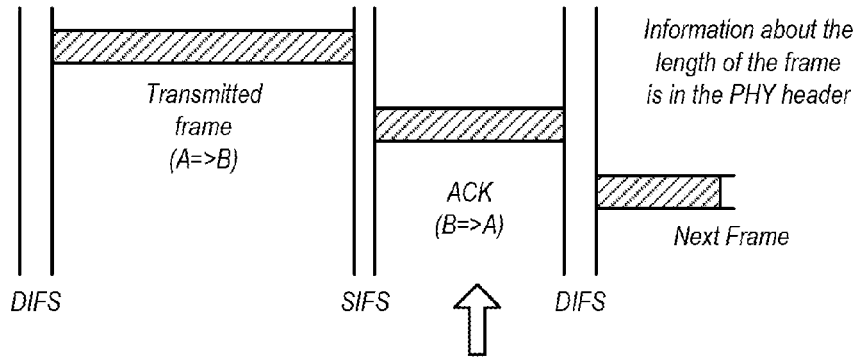
FIGS. 12-16 illustrate exemplary aspects of Wi-Fi communication, according to some embodiments.

FIGS. 12-16 illustrates aspects of the Wi-Fi channel sensing mechanism which may be leveraged according to the techniques described herein above. As shown in FIG. 12, information regarding the length of a transmitted frame may be provided in the PHY header of the frame. Based on such information, and standard/specified interframe spaces (e.g., DCF interframe space (DIFS) and short interframe space (SIFS)) and Acknowledgement lengths, a Wi-Fi device may be able to determine a length of time for which the medium will be occupied. This may enable the Wi-Fi device to conserve power (e.g., by sleeping for the period of time during which the medium will be occupied) and prevent conflicting medium usage.

Figure 13:
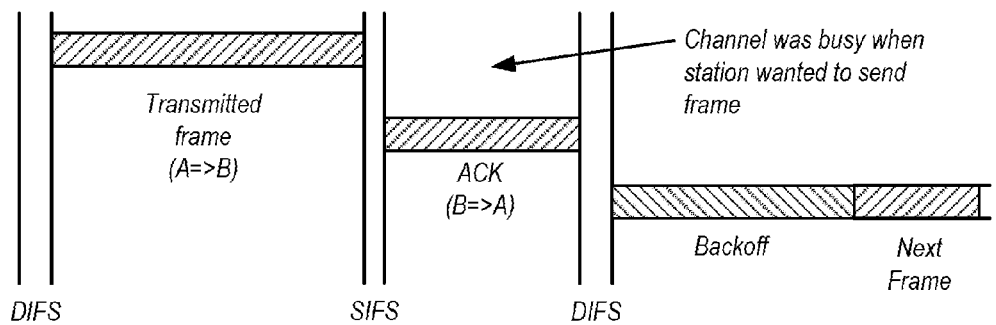

As shown in FIG. 13, once such a length of time has passed, a contention window (CW) may begin. Any Wi-Fi devices desiring to transmit at that time may wait until a randomly selected slot within the contention window before seizing the medium and beginning its transmission. If the medium is occupied (as may be detected by PHY sensing) at the time a Wi-Fi device's random backoff period ends (e.g., because another Wi-Fi device desiring to transmit had a shorter random backoff period/selected an earlier slot), the Wi-Fi device may again defer medium control and wait for the next contention window.

Figure 14:
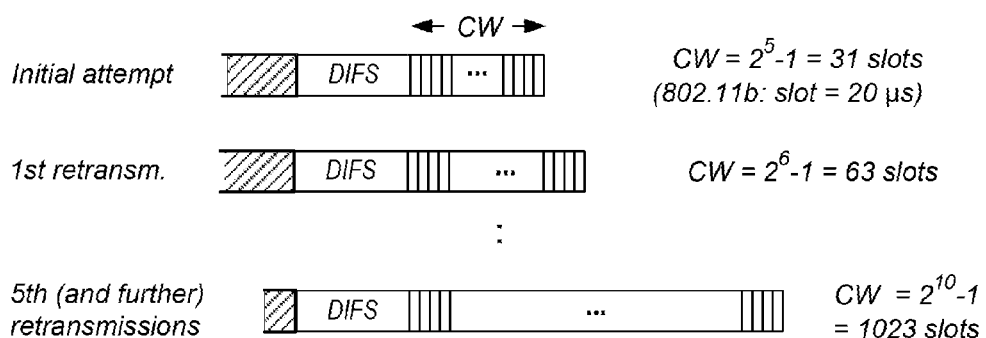

As shown in FIG. 14, subsequent retransmission attempts (i.e., after a transmission fails, for example due to medium conflict) may be subject to exponentially expanded contention windows. Increasing the number of slots in the contention window may decrease the likelihood of access conflicts (as there may be a greater number of slots from which to choose by Wi-Fi devices desiring medium access), and thus increase the likelihood of a successful transmission.

Figure 15:
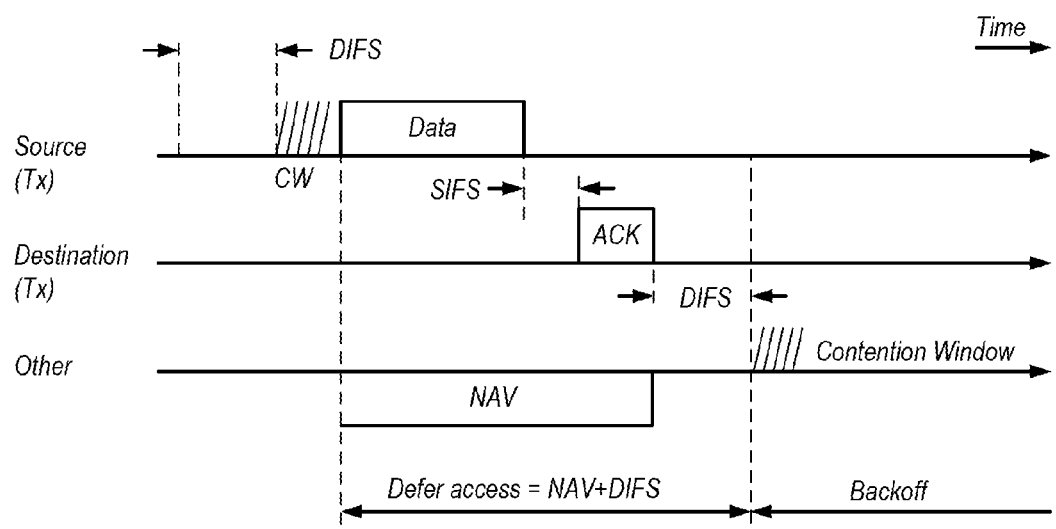

FIG. 15 illustrates the distributed coordination function (DCF) used by Wi-Fi, which includes the use of network allocation vector protection, contention windows, and random backoff periods as illustrated and described individually with respect to FIGS. 12-14.

Figure 16:
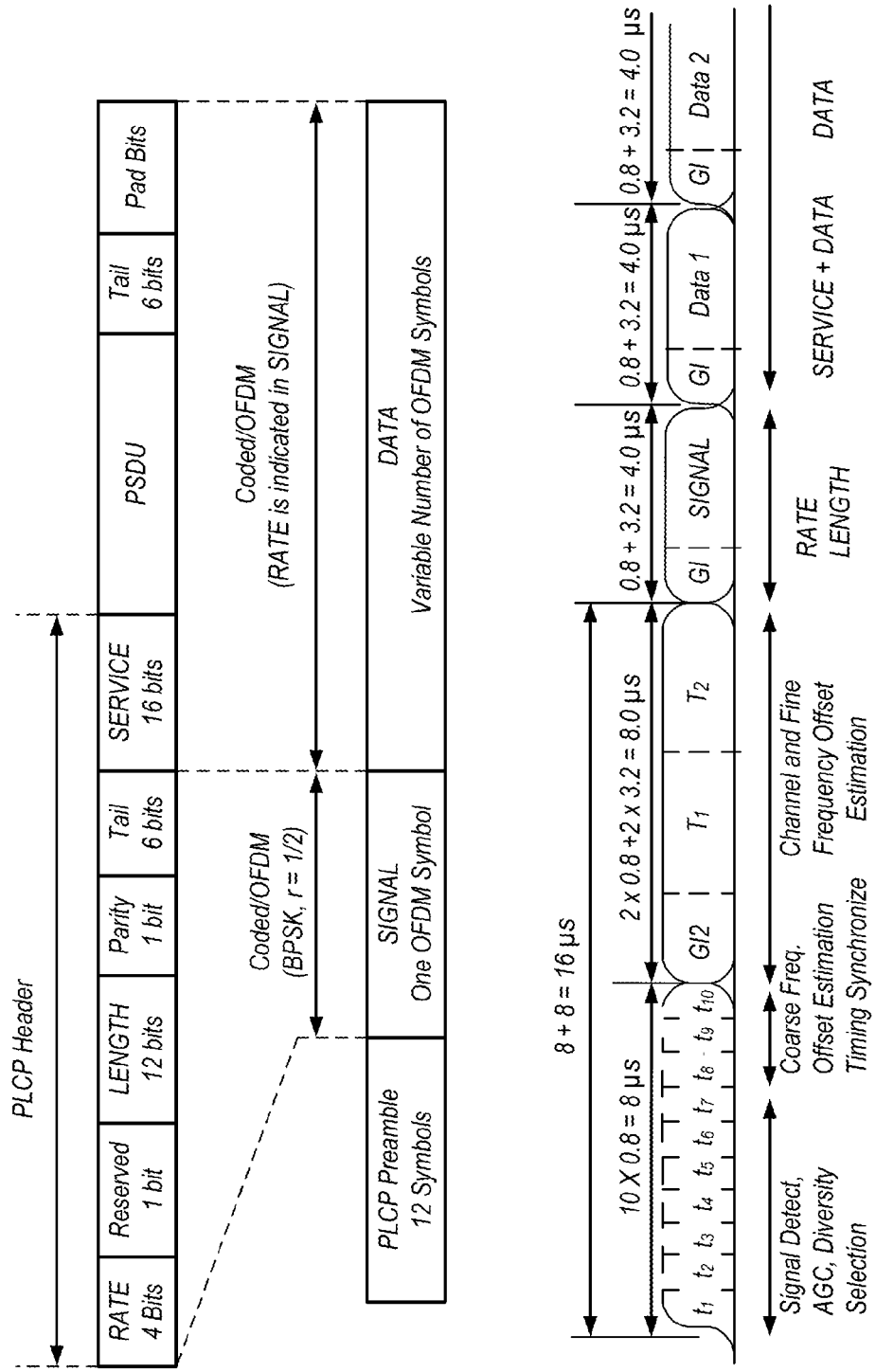

FIG. 16 illustrates an exemplary Wi-Fi physical layer protocol data unit (PPDU or PHY packet). As shown, a typical Wi-Fi PHY packet may include a 12 symbol PLCP preamble, a one symbol signal field, and then a variable number of symbols of data. The preamble may typically extend for approximately 16 µs, and may be used for signal detection, automatic gain control, diversity selection, course frequency offset estimation, timing synchronization, and channel and fine frequency offset estimation. The signal field may typically extend for approximately 4 μs, and may include portions indicating a coding rate used for the data portion of the communication and indicating a number of OFDM symbols, along with parity and tail bits. The signal field may use binary phase shift keying (BPSK) and a rate of ½ as its modulation and coding scheme (or more generally as according to the Wi-Fi specification). The data field may typically include data communicated using a number of symbols indicated by the signal field, which may be coded at the rate indicated by the signal field.

However, whereas a typical Wi-Fi communication frame may actually include Wi-Fi communication of data subsequent to the preamble and signal field according to the parameters indicated in the signal field, an LTE-U device (e.g., BS or UE) may transmit only the preamble and signal field using Wi-Fi communication according to the techniques described herein, and follow such Wi-Fi communication with LTE-U communication instead of Wi-Fi communication. Thus, while the LTE-U communication may not literally match the coding rate and number of symbols indicated in the signal field, the length of time used for the following LTE-U communication may match the length of time which would be used transmit the number of symbols indicated in the signal field at the coding rate indicated in the signal field.

In the following further exemplary embodiments of the disclosure are presented.

A first exemplary embodiment includes an apparatus comprising means for performing Wi-Fi signaling in conjunction with cellular communication in unlicensed frequency bands. The apparatus may include means for establishing an cell with a wireless user equipment (UE) device on a frequency channel in an unlicensed frequency band. The apparatus may further include means for scheduling a cellular communication with the UE device. Additionally, the apparatus may include means for transmitting a Wi-Fi signal on the frequency channel in conjunction with the scheduled cellular communication, wherein the Wi-Fi signal indicates a length of the scheduled cellular communication using Wi-Fi signaling. Further, the apparatus may include means for performing the scheduled cellular communication with the UE device via the cell.

A second exemplary embodiment includes a computer program with instructions for performing a method for performing Wi-Fi signaling in conjunction with cellular communication in unlicensed frequency bands. The method may include establishing an cell with a UE device on a frequency channel in an unlicensed frequency band. The method may further include scheduling a cellular communication with the UE device. Additionally, the method may include transmitting a Wi-Fi signal on the frequency channel in conjunction with the scheduled cellular communication, wherein the Wi-Fi signal indicates a length of the scheduled cellular communication using Wi-Fi signaling. Further, the method may include performing the scheduled cellular communication with the UE device via the cell.

In either or both of the above-described exemplary embodiments, the Wi-Fi signal may comprise a Wi-Fi preamble and signal field indicating a number of orthogonal frequency division multiplexing (OFDM) symbols corresponding to the length of the scheduled cellular communication. The Wi-Fi preamble and signal field may indicate a Wi-Fi communication having a length corresponding to the length of the scheduled cellular communication, where the indicated Wi-Fi communication is not performed. The signal field may indicate a number of orthogonal frequency division multiplexing (OFDM) symbols and a coding rate of the indicated Wi-Fi communication, wherein the number of OFDM symbols and the coding rate indicated correspond to a length of time of the scheduled cellular communication.

In any of the above-described exemplary embodiments, the cell may be a secondary cell in a carrier aggregation arrangement. The method may in this case include, or the apparatus may include means for, establishing a primary cell in the carrier aggregation arrangement with the UE device on a frequency channel in a licensed frequency band and performing cellular control communications for both the primary cell and the secondary cell via the primary cell.

In the just-described exemplary embodiment, scheduling the cellular communication with the UE device may be performed as part of the cellular control communications performed via the primary cell, and transmitting the Wi-Fi signal on the frequency channel in the unlicensed frequency band may be performed simultaneously with performing the cellular control communications via the primary cell.

Alternatively, cellular control communications may be performed via the cell, and scheduling the cellular communication with the UE device may be performed as part of the cellular control communications performed via the cell. In this case, transmitting the Wi-Fi signal on the frequency channel in the unlicensed frequency band may be performed simultaneously with or prior to performing the cellular control communications via the cell.

In any of the above-described exemplary embodiments, the scheduled LTE communication comprises one transmission time interval (TTI) according to LTE. Alternatively, in any of the above-described exemplary embodiments, the scheduled LTE communication comprises multiple TTIs according to LTE.

In any of the above-described exemplary embodiments, the cellular communications and cellular control communications may include LTE communications and LTE control communications.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station (BS), comprising:
one or more transceivers configured to perform LTE and Wi-Fi communications in unlicensed frequency spectrum;
a processing element;
wherein the one or more transceivers and the processing element are configured to:
establish a primary cell according to LTE with a wireless user equipment (UE) device on a frequency channel in a licensed frequency band;
establish a secondary cell according to LTE with the UE device on a frequency channel in an unlicensed frequency band;
schedule an LTE communication with the UE device on the secondary cell via the primary cell;
transmit a Wi-Fi or hybrid Wi-Fi/LTE signal on the frequency channel in the unlicensed frequency band, wherein the signal indicates a length of the scheduled LTE communication using Wi-Fi signaling; and
perform the scheduled LTE communication with the UE device on the secondary cell.

2. The BS of claim 1,
wherein the signal comprises a Wi-Fi preamble and signal field indicating a Wi-Fi communication having a length corresponding to the length of the scheduled LTE communication, wherein the indicated Wi-Fi communication is not performed.

3. The BS of claim 1, wherein the one or more transceivers and the processing element are further configured to:
monitor the wireless medium of the secondary cell for Wi-Fi signals prior to performing the scheduled LTE communication with the UE device on the secondary cell to determine whether the wireless medium is busy or free,
wherein the scheduled LTE communication is performed if the wireless medium is free,
wherein the scheduled LTE communication is not performed if wireless medium is busy.

4. The BS of claim 1,
wherein the signal is a hybrid Wi-Fi/LTE signal comprising both a Wi-Fi preamble and LTE signals configured for LTE time and frequency tracking in unlicensed spectrum.

5. The BS of claim 1, wherein the LTE transceiver, the Wi-Fi transceiver, and the processing element are further configured to:
transmit the Wi-Fi signal on the frequency channel in the unlicensed frequency band while scheduling the LTE communication with the UE device on the secondary cell via the primary cell.

6. A method for operating a cellular base station, the method comprising:
establishing a primary cell according to cellular communication with a wireless user equipment (UE) device on a frequency channel in a licensed frequency band;
establishing a secondary cell with UE device on a frequency channel in an unlicensed frequency band;
scheduling a cellular communication with the UE device on the secondary cell via the primary cell;
transmitting a hybrid Wi-Fi/cellular signal on the frequency channel in the unlicensed frequency band in conjunction with the scheduled cellular communication, wherein the hybrid Wi-Fi/cellular signal indicates a length of the scheduled cellular communication using Wi-Fi signaling, wherein the hybrid Wi-Fi/cellular signal also comprises cellular timing and frequency tracking information for use in the unlicensed frequency band; and
performing the scheduled cellular communication with the UE device via the secondary cell.

7. The method of claim 6,
wherein the hybrid Wi-Fi/cellular signal comprises a Wi-Fi preamble and signal field indicating a number of orthogonal frequency division multiplexing (OFDM) symbols corresponding to the length of the scheduled cellular communication.

8. The method of claim 6,
wherein the scheduled cellular communication comprises at least one transmission time interval (TTI).

9. The method of claim 6, wherein the secondary cell comprises a secondary cell in a carrier aggregation arrangement, the method further comprising:
performing cellular control communications for both the primary cell and the secondary cell via the primary cell.

10. The method of claim 9,
wherein scheduling the cellular communication with the UE device is performed as part of the cellular control communications performed via the primary cell,
wherein transmitting the signal on the frequency channel in the unlicensed frequency band is performed simultaneously with performing the cellular control communications via the primary cell.

11. The method of claim 6, the method further comprising:
performing cellular control communications via the secondary cell, wherein scheduling the cellular communication with the UE device is performed as part of the cellular control communications performed via the secondary cell.

12. The method of claim 11,
wherein transmitting the signal on the frequency channel in the unlicensed frequency band is performed simultaneously with or prior to performing the cellular control communications via the secondary cell.

13. A method for operating a wireless user equipment (UE) device, the method comprising:
establishing a primary cell according to long term evolution (LTE) with the UE device on a frequency channel in a licensed frequency band;
establishing a secondary cell according to LTE with a cellular base station on a frequency channel in an unlicensed frequency band;
receiving an uplink grant for uplink LTE communication with the cellular base station on the secondary cell via the primary cell;
transmitting a signal on the frequency channel in the unlicensed frequency band in conjunction with the scheduled uplink LTE communication, wherein the signal indicates a length of the scheduled uplink LTE communication using Wi-Fi signaling; and
performing the uplink LTE communication with the cellular base station on the secondary cell.

14. The method of claim 13,
wherein the signal is a hybrid Wi-Fi/LTE signal further comprising a discovery reference signal (DRS) for LTE timing and frequency tracking.

15. The method of claim 13, wherein the signal comprises a Wi-Fi preamble and one or more PHY header fields, wherein the one or more PHY header fields comprise information indicating that a Wi-Fi communication having a length corresponding to the length of the scheduled uplink LTE communication is being performed, the method further comprising:

ceasing transmitting Wi-Fi signals after the Wi-Fi preamble and the one or more PHY header fields such that a remainder of the indicated Wi-Fi communication is not actually performed and Wi-Fi signals are not transmitted by the UE during a remainder of the scheduled uplink LTE communication.

16. The method of claim 13, wherein the length of the scheduled uplink LTE communication comprises an integer number of transmission time intervals (TTIs), wherein the length of the scheduled uplink LTE communication is indicated in the signal as a number of Wi-Fi orthogonal frequency division multiplexing (OFDM) symbols which corresponds to the length of the scheduled LTE communication.

17. The method of claim 13, wherein the secondary cell comprises a secondary cell in a carrier aggregation arrangement with the cellular base station, the method further comprising:

wherein the uplink grant for uplink LTE communication with the cellular base station is received via the primary cell.

18. The method of claim 13, wherein the uplink grant for uplink LTE communication with the cellular base station is received via the secondary cell.

19. The method of claim 13, the method further comprising:

providing an indication to transmit the signal in conjunction with the scheduled uplink LTE communication from LTE circuitry of the UE device to Wi-Fi circuitry of the UE device via an LTE-Wi-Fi coexistence interface.

20. The method of claim 13, wherein transmitting the signal in conjunction with the scheduled uplink LTE communication restrains Wi-Fi devices receiving the signal from performing Wi-Fi transmissions on the frequency channel in the unlicensed frequency band during the scheduled uplink LTE communication.

\* \* \* \* \*